United States Patent [19]
Schmeisser et al.

[11] Patent Number: 5,333,985
[45] Date of Patent: Aug. 2, 1994

[54] CAN BLANK HANDLING APPARATUS

[76] Inventors: Heinz Schmeisser, 3437 S. Crandon Pl., Greenfield, Wis. 53219; James A. Franz, 3960 Highway Y, West Bend, Wis. 53095

[21] Appl. No.: 791,438

[22] Filed: Nov. 13, 1991

[51] Int. Cl.⁵ .............................................. B65G 47/26
[52] U.S. Cl. ............................. 414/790.3; 414/789.1; 414/789.6; 414/790.2; 414/790.4
[58] Field of Search ............... 414/789.1, 789.9, 790.3, 414/790.4, 790.9, 791.5, 792.7, 900, 789.6

[56] References Cited

U.S. PATENT DOCUMENTS

| | | |
|---|---|---|
| 1,490,235 | 1/1921 | Smith et al. |
| 1,538,322 | 5/1925 | Gunter ........................ 414/790.9 |
| 1,615,763 | 1/1927 | Kaufmann ..................... 414/792.7 |
| 3,027,021 | 8/1958 | Kramer . |
| 3,088,604 | 5/1960 | Nilsson . |
| 3,611,852 | 10/1971 | Strilich ........................ 414/794.8 |
| 3,762,579 | 7/1971 | Schade . |
| 3,902,609 | 12/1973 | Ohlsson ....................... 414/792.7 |
| 4,538,511 | 4/1985 | Wise ............................ 414/789.9 |
| 4,541,763 | 7/1983 | Chandhoke et al. . |
| 4,635,786 | 1/1985 | Renda . |
| 4,844,686 | 7/1989 | Stevenson ................... 414/788.4 |
| 5,122,030 | 6/1992 | Schmeisser et al. ......... 414/790.4 |

FOREIGN PATENT DOCUMENTS 2096581 10/1982 United Kingdom ............ 414/792.7

OTHER PUBLICATIONS

Modern Metals, Mawag Machinenbau AG "Automatic Transfer System ATS-165", Feb. 1991.
Krupp, "Cut-O-Mat", Roboter and Bodymaker.
Cepak, TX2 Left "Automatic Conveyor for Conveying Blanks from Slitter to Welding Machine Hopper with and without Blank Overturn".
Fael, "Belt-Type Blank Feeder", engineering diagram.
Robbins & Keating International, Inc., "Automatic Blanks Conveyor".

Primary Examiner—Michael S. Huppert
Assistant Examiner—Gregory A. Morse

[57] ABSTRACT

An apparatus for accumulating blanks into stacks and transferring the stacks into a welder hopper of a can former/welder includes an arrangement of side-by-side blank accumulating pockets at an output of a slitter. The side-by-side arrangement is movable to adjacent an indexing and storage station and a pusher to push the stacks from the side-by-side arrangement to the indexing and storage station is provided. The indexing and storage station moves in an indexed fashion to align each stack individually with a single stack receiving station, where single stacks are received from the indexing and storage station. The stack in the single stack receiving station is blocked, lifted and rotated for engagement by an overhead gripper of a gantry assembly which moves the stack to the welder hopper when needed.

28 Claims, 7 Drawing Sheets

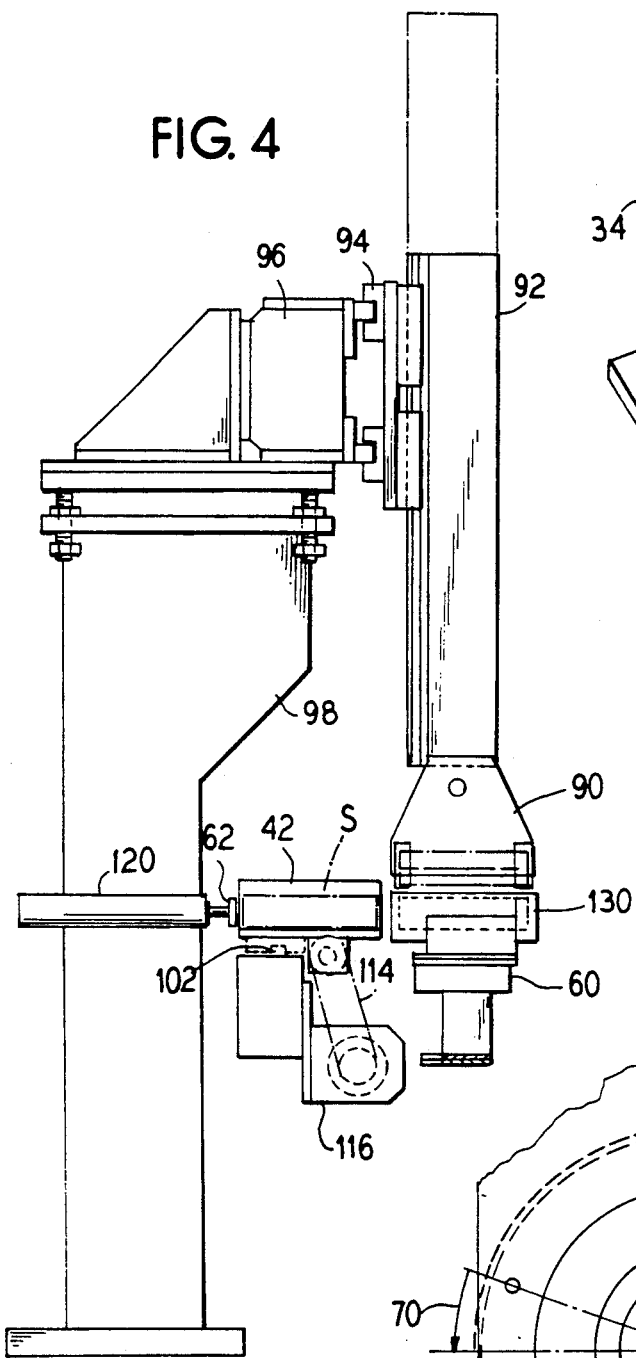
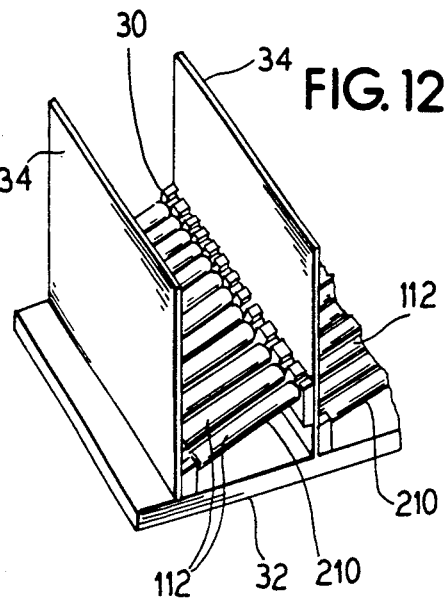
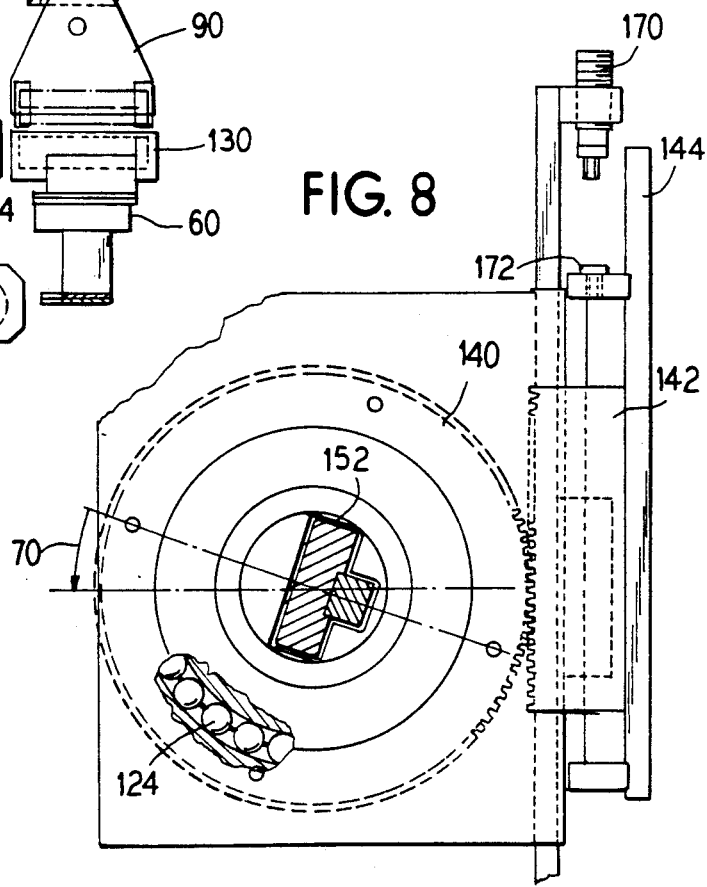

5,333,985

CAN BLANK HANDLING APPARATUS

BACKGROUND OF THE INVENTION

1. Field of the Invention

The present invention relates generally to an apparatus for stacking can blanks and transferring the stacked blanks to the feed hopper of a can welder.

2. Description of the Related Art

In the making of three-piece cans, in other words those cans having a generally cylindrical body and separate end caps, the can body is formed of blanks cut from sheet metal, the blanks being formed into a cylinder and welded in a welder. First, sheets of metal are fed into a slitter which generally cuts the sheet metal in two perpendicular directions to form a plurality of can blanks. The blanks must be transferred into the feed hopper of the welder/former. Heretofore, workers were hired to gather and stack the blanks, block the stacks to assure their alignment, and carefully place the blanks into the feed hopper as needed. Permitting the feed hopper of the welder to run out of blanks unnecessarily interrupts the can making operation. However, an excessive number of blanks in the feed hopper may result in jamming of the blank feeder. In addition, the blank feeder for the welder may also jam when stacks of blanks are allowed to drop into the feed hopper from more than a predetermined height.

An apparatus for transporting can blanks and the like is disclosed in U.S. Pat. No. 5,122,030 for feeding can blank stacks to a welder hopper as needed. The apparatus disclosed therein includes a chain conveyor for catching the blanks as they are fed from the slitter output and moving the blanks laterally to the end of the conveyor, where the blanks are thrown into a stack forming location on a turntable having a number of stack holding locations. The stack forming location includes a reciprocating member to abut and thereby align the blanks into a stack. The turntable is rotatable to move other stack locations into position at the end of the conveyor, thereby moving the just-formed stack into a holding position on the turntable. Once the turntable moves a stack into a position in alignment with a transport gantry, a gripper on the end of a vertical arm is lowered to grip the stack, lift the stack, and transport the stack horizontally into a position over the welder hopper. The stack is then lowered and released by the gripper onto the top of the previously transported can blanks in the welder hopper.

SUMMARY OF THE INVENTION

It is an object of the present invention to provide a simple, efficient and effective blank stacking and transporting apparatus.

It is another object of the present invention to accommodate a variety of layouts of blank slitters and can welders in a factory in an automated system for transferring can blanks from the slitter to the welder.

It is a further object of the present invention to provide a can blank accumulating and transfer device utilizing little floor space and providing walk-through clearance between the slitter and the welder as well as providing access to the slitter for repairs and maintenance.

It is yet a further object of the present invention to provide simple change over in a blank handling apparatus for handling different sizes of blanks.

These and other objects of the present invention are achieved in a can blank accumulating and transfer apparatus for moving can blanks from a slitter to a welder hopper, the apparatus including a side-by-side arrangement of can blank receiving pockets positionable at the output of a slitter, the side-by-side arrangement including means for accumulating into stacks a plurality of can blanks output by the slitter so that the stacks are in side-by-side relation. An indexing station and the side-by-side arrangement are selectively positionable along side one another so that the indexing station may receive the stacks from the side-by-side arrangement. The stacks are transferred from the side-by-side arrangement into the indexing station by a first transferring means. The indexing station is positionable adjacent a single stack receiving station which includes means for receiving single stacks from the indexing station, and a second means for transferring the stacks is provided to transfer one stack at a time from the indexing station to the single stack receiving station. Once a single stack of blanks is in the single stack receiving station, the stack is prepared for engagement by a transport means, such as a transport gantry, and the transport means engages the stack and transfers the stack into the welder hopper.

The side-by-side arrangement thereby accumulates the blanks being output by the slitter and forms the blanks into stacks. After transfer, the stacks are stored in the indexing station for individual transfer to the single stack receiving station. At the single stack receiving station, the stack is prepared for engagement by the transport means, including blocking, lifting and rotating the stack.

In one embodiment, the side-by-side arrangement is moved from a position at the output of the slitter into a position along side the indexing station so that the first means for transferring may transfer the stacks into the indexing station. It is, of course, possible for the indexing station to move into a position along side a stationarily arranged side-by-side arrangement for transfer of the blank stacks.

To align the stacks as they are received in the side-by-side arrangement, means for intermittently contacting the edges of the stacks during the accumulation of the blanks into stacks in the side-by-side arrangement is provided. Alternately, stationary stops may provided at each of the pockets of the side-by-side arrangement to assure alignment of the blanks.

The blanks are preferably accumulated in the side-by-side arrangement so that the stacks lie at an angle to the horizontal to accommodate the thickness of the generally vertically disposed walls mounted on a base which define the side-by-side pockets for receiving the blanks in the side-by-side arrangement. While a block may be provided at one side of each pocket to support the blanks at an angle to horizontal, preferably, blank supporting surfaces mounted at an angle in each of the pockets of the side-by-side arrangement are provided to support the bottom-most blank of each stack. In a preferred embodiment, the blank supporting surfaces incorporate a plurality of parallel arranged rollers to support the stack of blanks for rolling movement during the transfer operation. The indexing station likewise includes vertical walls defining pockets for holding the stacks. The preferred embodiment of the indexing station includes rollers in the blank supporting surfaces in the pockets.

Although it is possible to transfer the stacks of blanks from the side-by-side arrangement into the indexing station by a variety of means including one at a time, it is preferred that the stacks in the side-by-side arrangement all be transferred into the indexing station substantially simultaneously. A comb-type structure having a number of fingers that engage and push the edges of all of the stacks provides an effective transfer means.

Once in the indexing station, which is preferably formed of a plurality of vertically disposed walls mounted on a base similar to that of the side-by-side arrangement, the stacks likewise lie at an angle to the horizontal. As in the side-by-side arrangement, blank supporting surfaces may be provided, the blank supporting surfaces preferably incorporating rollers on which the blank stacks are supported. The rollers in the pockets prevent the marking and scratching of the blanks during the transfer operation.

The indexing station is indexed or moved the width of one stack with at a time to sequentially align the pockets with the single stack receiving station so that one stack at a time may be transferred into the single stack receiving station. To prepare the single stack in the single stack receiving station for engagement by the transfer means, the single stack receiving station preferably moves the angled stack into a horizontal position, such as by lifting the stack from the position in which it was originally transferred into the single stack receiving station. This simultaneously blocks the stack to align all the blanks therein with one another. To accommodate different relative positions between the slitter and the welder hopper, the single stack receiving station is rotatable about a vertical axis to any desired angular position. Accordingly, the single stack of blanks in the single stack receiving station is rotated as needed from the position at which it was received from the indexing station to a position for engagement by the transport means. As an alternate possibility, the rotation of the stack may occur after the stack is engaged in the gripper of the transport means.

In a preferred embodiment, the side-by-side arrangement, the indexing station, and the single stack receiving station are all mounted on a base which includes a heavy duty bearing for rotation of the unit away from adjacent equipment such as for maintenance or repair of the slitter.

A variety of sensors and drivers are provided, all under the control of a programmable controller to ensure an uninterrupted supply of blanks to the welder hopper on an as-needed basis by the present can blank accumulating and transfer device. The controller halts the operation of various components of the present device and/or of the slitter for smooth operation.

The present invention is particularly well adapted for easy change out to accommodate different size can blanks. By exchanging the bases on which the pockets of the side-by-side arrangement and of the indexing station are mounted, the single stack receiving station parts, and the grippers on the transport means, the system is ready for use with different size can blanks.

BRIEF DESCRIPTION OF THE DRAWINGS

FIG. 4 is an end elevational view of the indexing station, the single stack receiving station and the transfer gantry shown removing a stack from the single stack receiving station;

FIG. 8 is a horizontal cross section along line VIII—VIII of FIG. 5 showing the rotation of the lifting beam;

FIG. 12 is a perspective view of a preferred blank support surface including rollers for use in the pockets of the side-by-side arrangement and the indexing station of the present invention.

DESCRIPTION OF THE PREFERRED EMBODIMENTS

Figure 1:
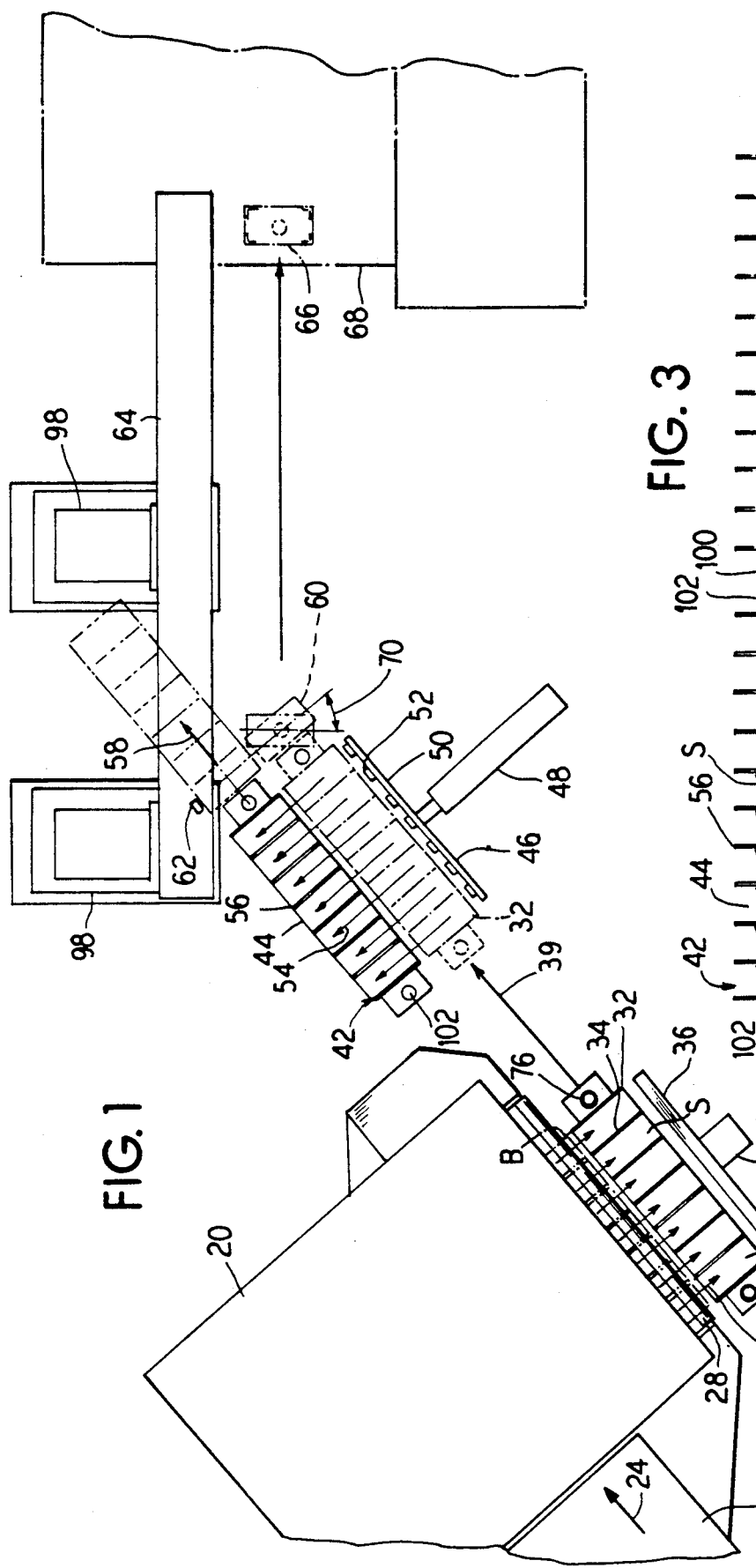
FIG. 1 is a plan view of an overall layout of the present can blank accumulating and transfer apparatus for receiving blanks from a slitter and feeding the blanks into a welder hopper according to the principles of the present invention.

In FIG. 1 is shown an overhead view of a slitter 20 receiving a piece of sheet metal 22 moving into the slitter in the direction of arrow 24. The metal sheet 22 is slit first in one direction in the direction of the arrow 24 and then in a direction transverse thereto to form a number of blanks B of a size required to form the body of a three-part can. The blanks B are fed from the output of the slitter 20 in side-by-side relation in the direction of arrows 26 through slitter output rollers 28.

As the blanks B leave the slitter 20 and are released by the rollers 28, they drop in side-by-side relation into pockets 30 in a side-by-side arrangement or transfer station 32 according to the present invention. The side-by-side arrangement 32 is shown in solid outline in the blank accumulating position in FIG. 1. The side-by-side arrangement 32 is so called because of a plurality of generally vertical walls 34 that define the side-by-side pockets 30 for receiving and holding the blanks B. As a result of the thickness of the walls 32 and the need to align the pockets 30 with the blanks B as they are fed from the slitter 20, the pockets 30 are narrower than the blanks B, causing the blanks B to lie at an angle to horizontal when in the pockets 30. The blanks B may be supported in their angular position only at their two opposite edges when in the pockets 30 such as on a block 35 (shown in FIG. 2) mounted in each pocket to support the upper edge of the blanks. Instead, the pockets 30 may include a lower support surface mounted at the desired angle onto which the lower-most one of the blanks rest.

The blanks B fall into the pockets 30 on top of one another to form stacks S in each of the pockets 30. Periodically during the formation of the stacks S, a tamper 36 having a blank contacting surface 38 driven by an actuator 40, such as a pneumatic cylinder, tamps the edges of the stacks S in the side-by-side arrangement to insure that the blanks B are aligned with one another as the stacks S are being formed. Instead, stationary members may be provided on the side of the side-by-side arrangement 32 against which the blanks B abut when falling into the pockets 30. It is generally necessary to have some restraining means on either end of the pockets when the blanks B are being received which is not present when the stacks S are being removed from the side-by-side arrangement 32.

Once the stacks S reach a desired height, such as 3 inches, the side-by-side arrangement or transfer station 32 is moved laterally in the direction of arrow 39 from the accumulating position to a transfer position shown in dotted outline in FIG. 1. The direction of movement 39 is dependent on the factory layout and the direction of the welder from the slitter 20 and thus may be varied as desired. When in the transfer position, the side-by-side arrangement 32 is along side a storage and indexing station 42, which includes a like number of side-by-side pockets 44 into which the stacks S are received.

To move the stacks S from the side-by-side arrangement 32 into the storage and indexing station 42, a transfer means 46 including an actuation cylinder 48 on which is mounted a horizontal arm 50 having a number of downwardly extending fingers 52 is provided. Operation of the actuation cylinder 48, which is preferably a pneumatic cylinder, causes the fingers 52 to engage the end faces of the respective stacks S in the side-by-side arrangement 32 and push the stacks S into the pockets 44 of the storage and indexing station 42, as shown by the arrows 54. To ensure that the stacks S move freely from the side-by-side arrangement 32 to the storage and indexing station 42, the pockets 44 in the storage and indexing station 42 are slightly wider and slightly lower than those in the side-by-side arrangement 32. The wider pockets 44 are possible by using thinner walls 56 on the storage and indexing station 42 as compared to the walls 34 of the side-by-side arrangement 32. In one embodiment, the walls 34 of the side-by-side arrangement are 3/16 inch thick and the walls 44 of the indexing station 42 are ⅛ inch thick.

Once the stacks S are in the storage and indexing station 42, the storage and indexing station 42 is moved in the direction of the arrow 58 to align each of the pockets 44 one at a time with a single stack receiving station 60, thereby undergoing indexing motion. As each of the pockets 44 is aligned along side the single stack receiving station 60, an actuating cylinder and arm (shown in FIG. 4) having a single stack engaging finger 62 is actuated to push the corresponding stack S from the storage and indexing station 42 into the single stack receiving station 60. The stacks S which remain in the storage and indexing station 42 are effectively in storage until needed, at which time they are in turn moved into the single stack receiving station 60. As with the side-by-side arrangement 32, the direction and extent of movement of the storage and indexing station 42 depends upon the factory layout and the direction and distance of the welder from the slitter 20.

While in the single stack receiving station 60, the stack S is prepared for engagement by a removal means or transfer gantry 64 which moves the stack S from the single stack receiving station 60 to a welder hopper 66 of a can welder/former 68. In a preferred embodiment, the single stack receiving station 60 moves the stack S from its angled position to a horizontal position, lifts the stack S from a transfer height to an engagement height, and rotates the stack S by an angle 70 from the position at which the stack S was received from the storage and indexing station 42 to a position in alignment with the transfer direction of the removal means 64. In some installations, the angle 70 may be zero, the stack S already being in alignment with the removal means 64, but more commonly the angle 70 of rotation of the stack S in the single stack receiving station 60 is between 0 and 90 degrees, and occasionally greater than 90 degrees, depending on the factory layout and the direction of the welder 68 from the single stack receiving station 60.

The removal means or transfer gantry 64 is generally similar in construction and operation to that disclosed in co-pending U.S. patent application Ser. No. 598,791, the appertaining portions of which are incorporated herein by reference. Briefly, the transfer gantry 64 includes a horizontal beam mounted on a pair of vertical supports, the horizontal beam including a track along which moves a carriage having a vertical arm with a gripper at the lower end thereof. The arm is vertically movable, thereby enabling the gripper to be lowered to engage the stack S in the single stack receiving station 60, lift the stack S to a height sufficient to, preferably, permit the movement of people and/or equipment therebeneath, move horizontally to above the welder hopper 66, and lower the stack to just above the top-most blank in the hopper 66. Sensors determine the position of the top-most blank in the hopper 66 and cause the gripper to release the transported stack S gently onto the stack already in the welder hopper 66. The removal means or transfer gantry 64 operates on an as-needed basis so that stacks S of blanks are deposited there only when the hopper stack drops below a predetermined level, as determined by further sensors. The horizontal beam of the transfer gantry 64 is of a length determined by the distance between the single stack receiving station 60 and the welder hopper 66, and is preferably cantilevered so as not to require an upright support near the welder.

Figure 2:
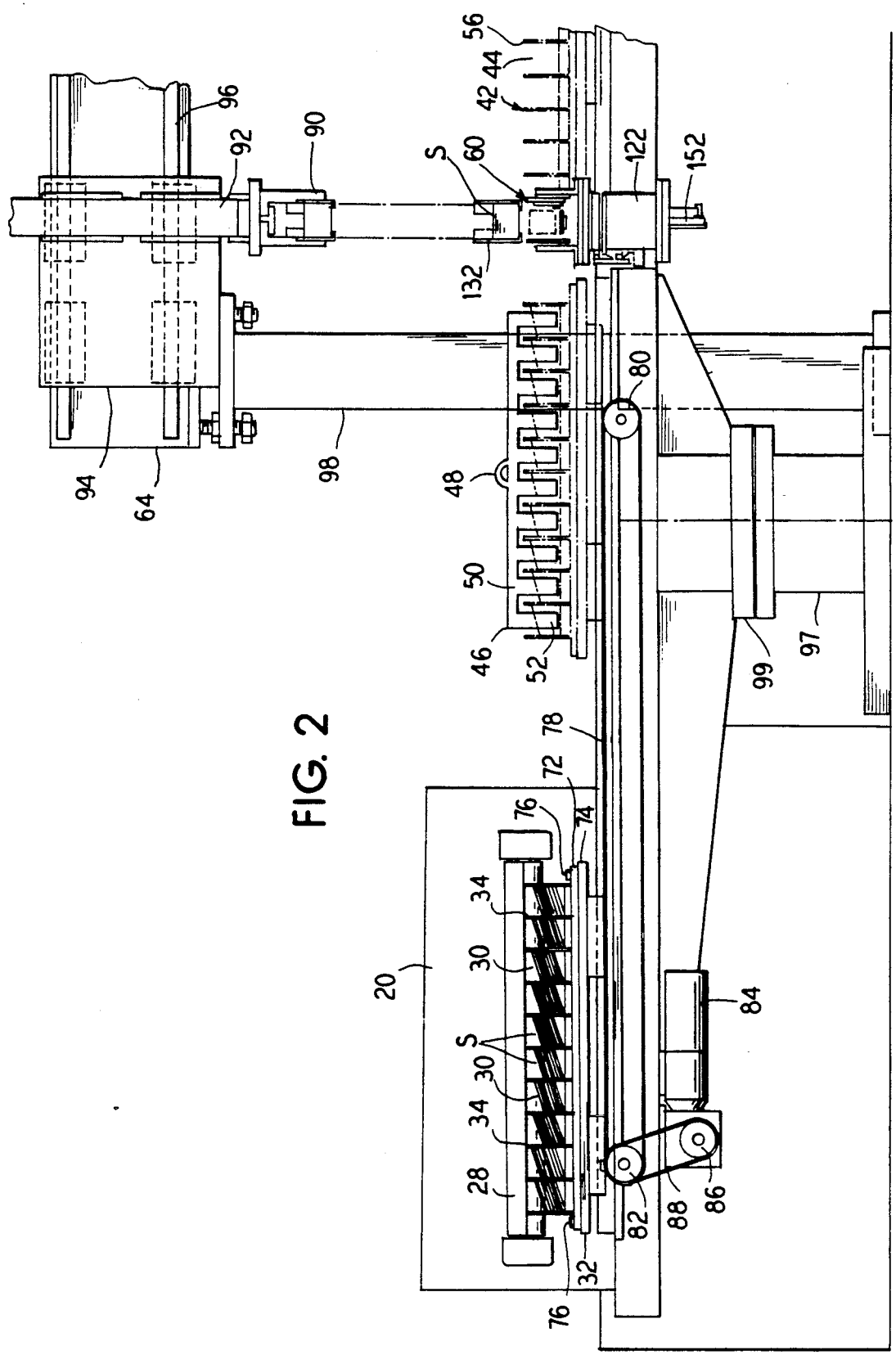
FIG. 2 is a front elevational view of the apparatus shown in FIG. 1 showing details of the side-by-side arrangement.

In the front view of FIG. 2, the side-by-side arrangement 32 is shown in solid outline at the output of the slitter 20 receiving the blanks B and accumulating them into stacks S in the pockets 30. As mentioned above, the pockets 30 are formed by the vertical walls 34. The walls 34 are mounted on a base 72, which is removably mounted on a platform 74 by mounting pins 76. The mounting pins 76 permit the base 72 to be removed from the platform 74 by lifting the base 72 off the pins 76. A base having walls spaced a different distance apart to accommodate blanks of a different size may then be mounted on the platform 74. Easy change over for different size cans is thereby accomplished.

To move the side-by-side arrangement 32 in an endwardly direction to the transfer position, the platform 74 is mounted for sliding movement on a floor support and is driven therealong by a toothed belt 78 extending between pulleys 80 and 82. The pulley 82 is driven by a motor 84 acting through a right angle transmission 86 and a drive belt 88. By controlling the motor 84, the side-by-side arrangement 32 is thus moved between the blank accumulating position at the output of the slitter 20 and a transfer position as shown in dotted outline. An alternate embodiment replaces the motor 84 and belt 78 with a pneumatic cylinder.

While in the transfer position, the pockets 30 of the side-by-side arrangement 32 are each aligned with the fingers 52 of the transfer means 46. After the transfer means 46 removes the angled stacks S from the side-by-side arrangement 32, the motor 84 is controlled to move the side-by-side arrangement 32 back to the stack accumulating position at the output of the slitter 20.

The storage and indexing station 42, which is shown in dotted outline in FIG. 2, transfers the stacks S one at a time into the single stack receiving station 60 for engagement by a gripper 90 of the transfer gantry 64. The transfer gantry 64 includes a vertically movable arm 92 which carries the gripper vertically between the two positions shown in FIG. 2. When the gripper 90 is in the upper-most position shown in FIG. 2, a carriage assembly 94 supporting the vertical arm 92 is moved along a beam 96 of the transfer gantry 64 to the position above the welder hopper 66. The horizontal beam 96 is supported on legs 98 at a predetermined height above the floor of the factory to provide clearance for persons and equipment.

In a preferred embodiment, the side-by-side arrangement 32, the storage and indexing station 42, and the single stack receiving station 60 are all supported on a common base or floor support 97 which is preferably mounted on an oversize, heavy duty bearing 99 so that the entire unit can be rotated away from the front of the slitter 20 should the need for repair of the slitter arise.

Figure 3:
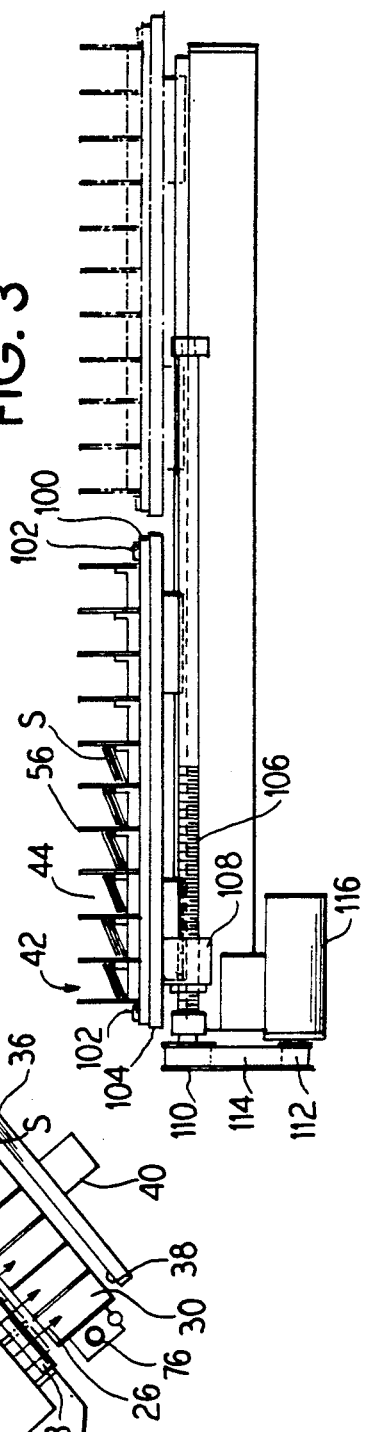
FIG. 3 is a front elevational view of an indexing station of the apparatus shown in FIG. 1.

Referring now to FIG. 3, the storage and indexing station 42 includes the pockets 44 formed by the walls 56 which hold the stacks S. Just as with the side-by-side arrangement 32, it is desirable to be able to easily change the storage and indexing station 42 to accommodate different sizes of can blanks. Accordingly, a structure similar to the removable mounting means provided on the side-by-side arrangement 32 is likewise provided for the storage and indexing station 42, including a base 100 supported by pins 102 on a platform 104 from which the base 100 can be removed for replacement by other bases having different size pockets.

A threaded drive shaft 106 is mounted beneath the storage and indexing station 42, and a drive nut 108 mounted on the shaft 106 is affixed to the underside of the platform 104 so that rotation of the threaded drive shaft 106 moves the platform 104 in a direction along its length. The threaded drive shaft 106 is driven through a set of pulleys 110 and 112 connected by a belt 114. A precision servo motor 116 drives the pulley 112 and is controlled to accurately sequentially position each of the pockets 44 in alignment with the single stack receiving station 60.

In FIG. 4 can be seen the position of the storage and indexing station 42 adjacent the single stack receiving station 60 when in the transfer position. The single stack engaging finger 62 with its actuating cylinder 120 is mounted to push individual stacks from the storage and indexing station 42 into the single stack receiving station 60. The precision stepper motor 116 which moves the storage and indexing station through the drive belt 114 is also shown in FIG. 4. The vertical arm 92 with its gripper 90 formed by opposed gripper fingers is above the single stack receiving station 60 although the transverse beam 96 on which the arm 92 and gripper 90 are supported need not be in alignment with the indexing station 42 since the single stack receiving station 60 is rotatable as desired.

Figure 5:
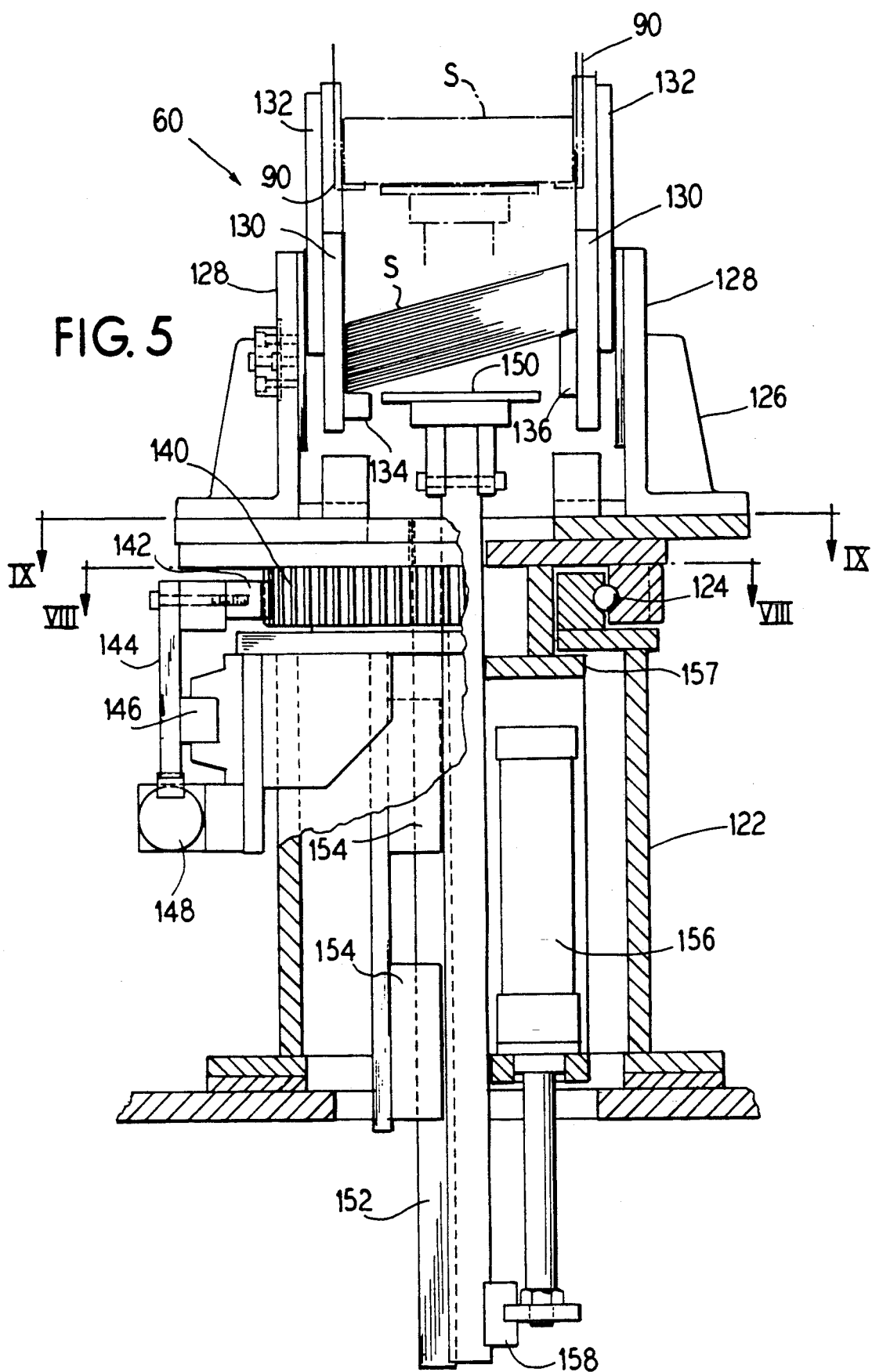
FIG. 5 is a vertical cross section of the single stack receiving station showing the lifting and rotating apparatus for preparing the stack for engagement by the transfer gantry.

In FIG. 5 is shown the single stack receiving station 60 in which a single stack S of blanks that has been received from the storage and indexing station 42 is blocked and lifted to an engagement position shown in dotted outline in FIG. 5. As will be described later, the stack S is also rotated about a vertical axis as needed. The single stack receiving station 60 includes a housing 122 at the top of which is mounted a roller bearing assembly 124 supporting a stack receiving and blocking structure 126 for rotation about the vertical axis. The blocking structure 126 includes a pair of frame members 128 between which are mounted a pair of side plates 130 that are spaced apart a distance substantially equivalent to the width of the blanks in the stack S. Thus, as the stack S is moved from its angled position to a horizontal position, it is blocked to assure alignment of the blanks B with one another. Extending above the side plates 130 are four corner pieces 132 which support the corners of the stack S in the lifted position (shown in dotted outline) yet leave the sides of the stack S open for engagement by the grippers 90.

When initially transferred into the single stack receiving station 60, the stack S is at an angle between the sidewall plates 130 supported on a lower block 134 and an upper block 136. The angled support of the stack S leaves a gap between the edge of the stack S and one of the sidewall plates 130, which disappears as the stack S is lifted and flattened to a horizontal position. It is contemplated that the sidewalls 130 may be moveable inwardly and outwardly to block the stack before it is moved to a horizontal position; however, the preferred and simpler embodiment is illustrated in FIG. 5 with stationary sidewalls.

After being lifted in the single stack receiving station 60, the stack S is rotated about a vertical axis to the extent required for alignment with the welder hopper 66. To accomplish this rotation, a ring gear 140 is provided on the underside of the assembly 126 and is engaged by a rack gear 142. The rack gear 142 is affixed to a plate 144 that is slidably mounted in a linear bearing 146 and is driven by a rotation air cylinder 148. Actuation of the air cylinder 148 thereby rotates the assembly 126 on the roller bearings 124.

The lifting of the stack S is accomplished by a tooling plate 150 at the upper end of a lifting bar 152 that is supported for vertical sliding movement in guides 154. The vertical movement of the lifting bar 152 is accomplished by a lifting air cylinder 156 mounted in a rotatable housing portion 157 and having an actuating shaft connected to the lifting bar 152 via a block 158. Actuation of the lifting air cylinder 156 thereby moves the tooling plate 150 from the position shown in solid outline in FIG. 5 to the higher position shown in dotted outline, thereby lifting and flattening the stack S. The rotatable housing portion 157 in which is mounted the lifting cylinder 156, the lifting bar 152 and the guides 154 is suspended below the blocking structure 126 for rotation on the roller bearings 124.

Figure 6:
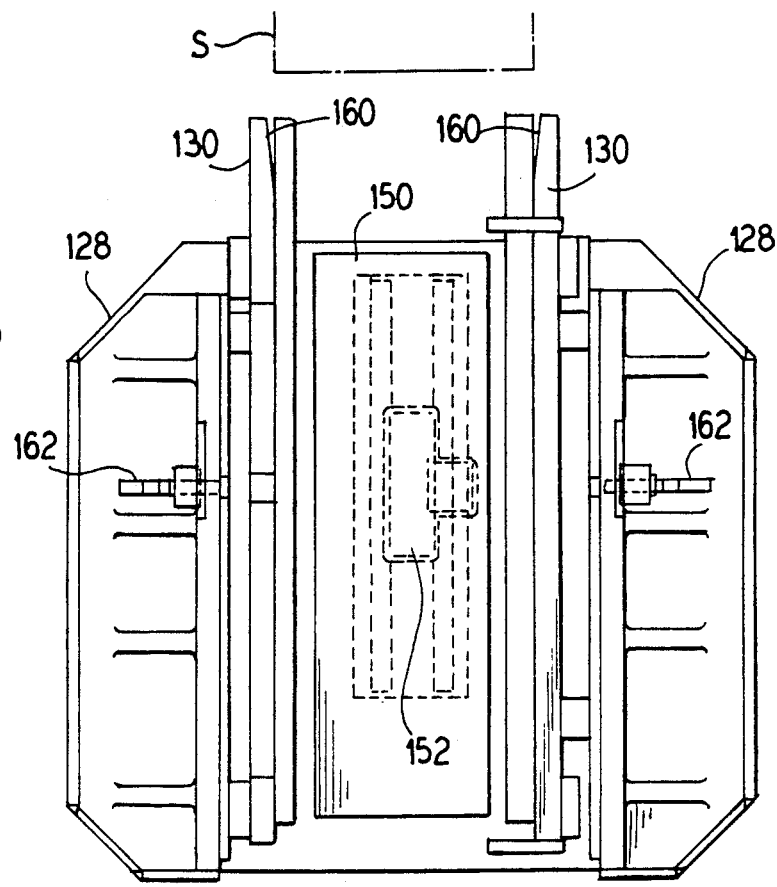
FIG. 6 is a plan view of the single stack receiving station of FIG. 5.

FIG. 6 shows an overhead plan view of the single stack receiving station 60 including the side plates 130 extending somewhat toward the indexing station 42 with outwardly directed bevels 160 at the stack receiving edges. The bevels 160 insure that the stack S is received smoothly into the single stack receiving station 60 even if the indexing station 42 is not aligned exactly with the single stack receiving station 60 every time. Adjustment means 162 for adjusting the position of each of the side plates 130 is provided. Shown in dotted outline is the lifting beam 152 below the machine plate 150 for lifting the stack S to the engagement position.

Figure 7:
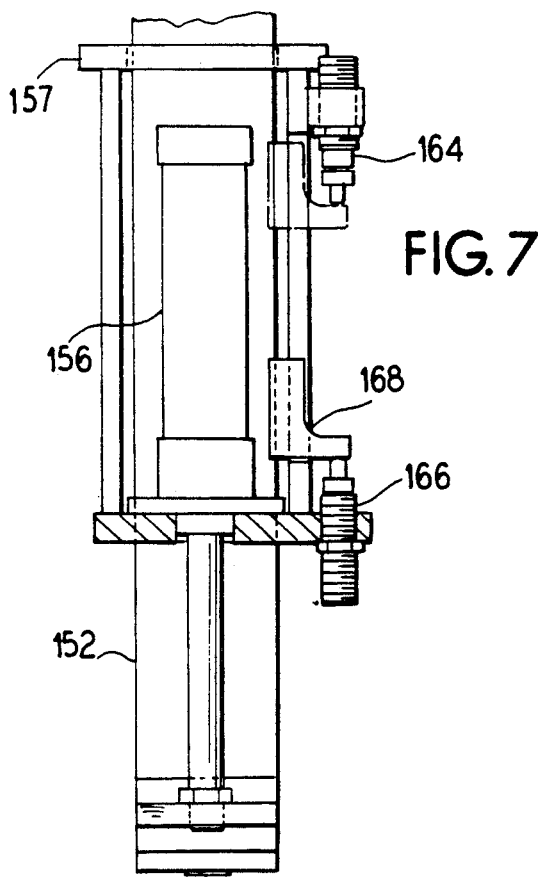
FIG. 7 is a side elevational view of the lifting beam and lifting cylinder of the single stack receiving station of FIG. 5.

FIG. 7 shows the lifting cylinder 156 mounted along side the lifting beam 152 in the rotatable housing portion 157. A pair of shock absorbers 164 and 166 are mounted at fixed positions relative to the lift cylinder 156. An abutment member 168 is mounted extending from the side of the lift beam 152 so that the abutment member 168 strikes the lower shock absorber 166 at the lower extend of its travel and strikes the upper shock absorber 164 at the upper extent of its travel (shown in dotted outline). The vertical travel of the lifting beam 152 us thereby limited and abrupt halts in movement is prevented which could disturb the alignment of the blanks in the stack are avoided.

In FIG. 8, the ring gear 140 and the rack gear 142 cooperate to rotate the blocking structure 126 and the rotatable housing portion 157 (both shown in FIG. 5) on the roller bearings 124 as the rack gear 142 is moved linearly. As shown, the lift beam 152 rotates with the rotatable housing portion 157. The linear movement of the rack gear 142 is effected by the rotation cylinder 148 (shown in FIG. 5) through the plate 144. The angle of rotation 70 is shown as the ring gear rotates on the roller bearings 124. Cushioning of any impact at the end of the rotation by the rotation cylinder 148 is provided by a shock absorber 170 mounted on the stationary housing 122 for abutment by an abutment member 172 on the sliding plate 144. The illustrated embodiment enables the stack to be rotated in one direction by 90 degrees. As an alternate embodiment, the rotation air cylinder is replaced with a servo motor which drives a gear that meshes with the gear ring 140 which rotates the stack, for example, by 90 degrees in either direction so that 180 degree rotation is possible.

Figure 9:
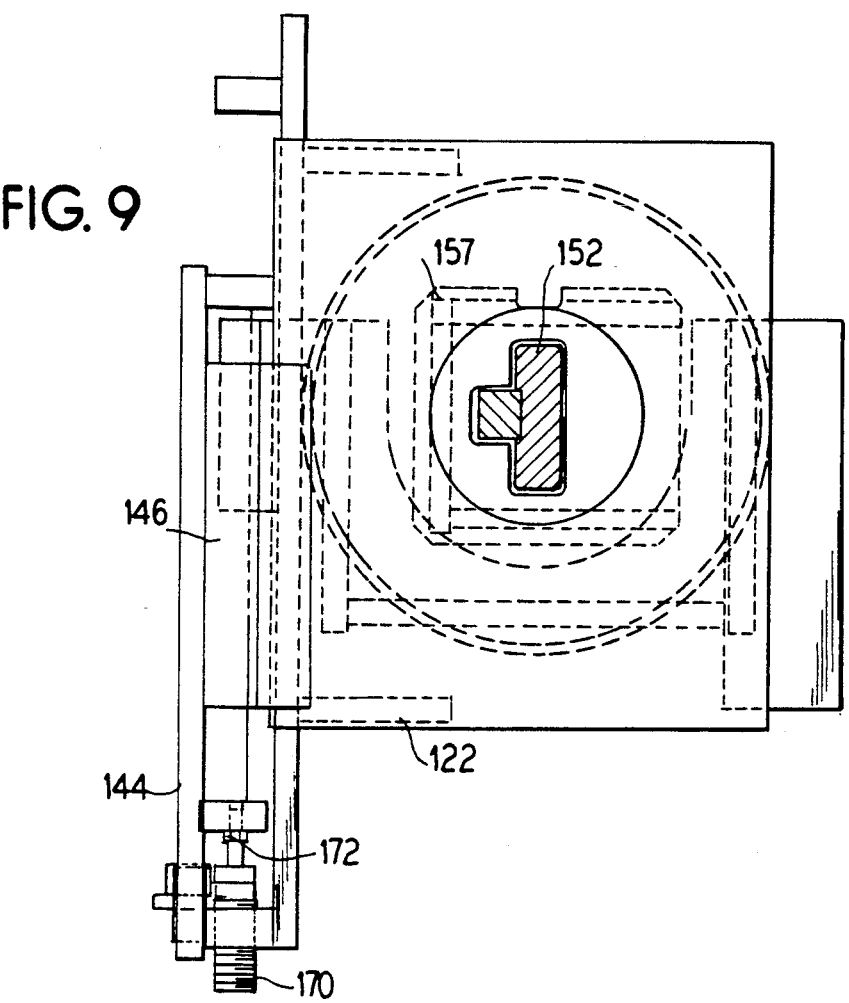
FIG. 9 is a horizontal cross section along line IX—IX of FIG. 5 showing the rotation cylinder mounting.
Figure 10:
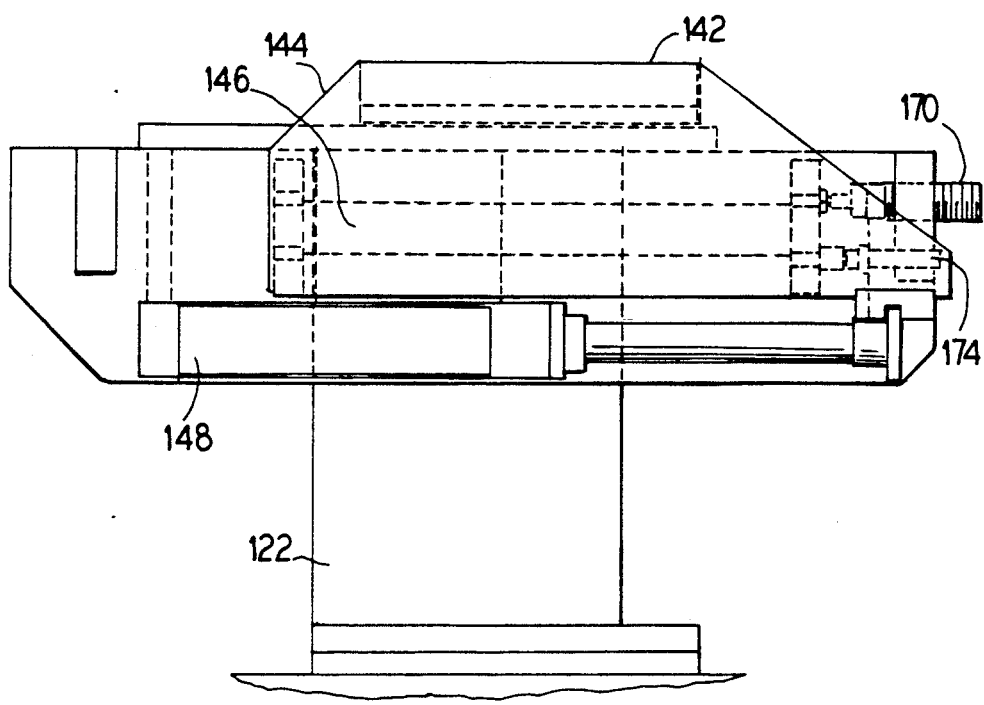
FIG. 10 is a side elevational view of the rotation cylinder mounting of the single stack receiving station.

FIGS. 9 and 10 show further view of the rotation cylinder 148, the sliding plate 144 and rack gear 142 driven by the cylinder 148, and the linear bearing 146 on which the plate 144 moves. Not only is a shock absorber 170 provided to absorb abrupt stops by the plate 144, but a limit adjusting screw 174 is also mounted between the plate 144 and the housing 122 of the single stack receiving station.

Figure 11:
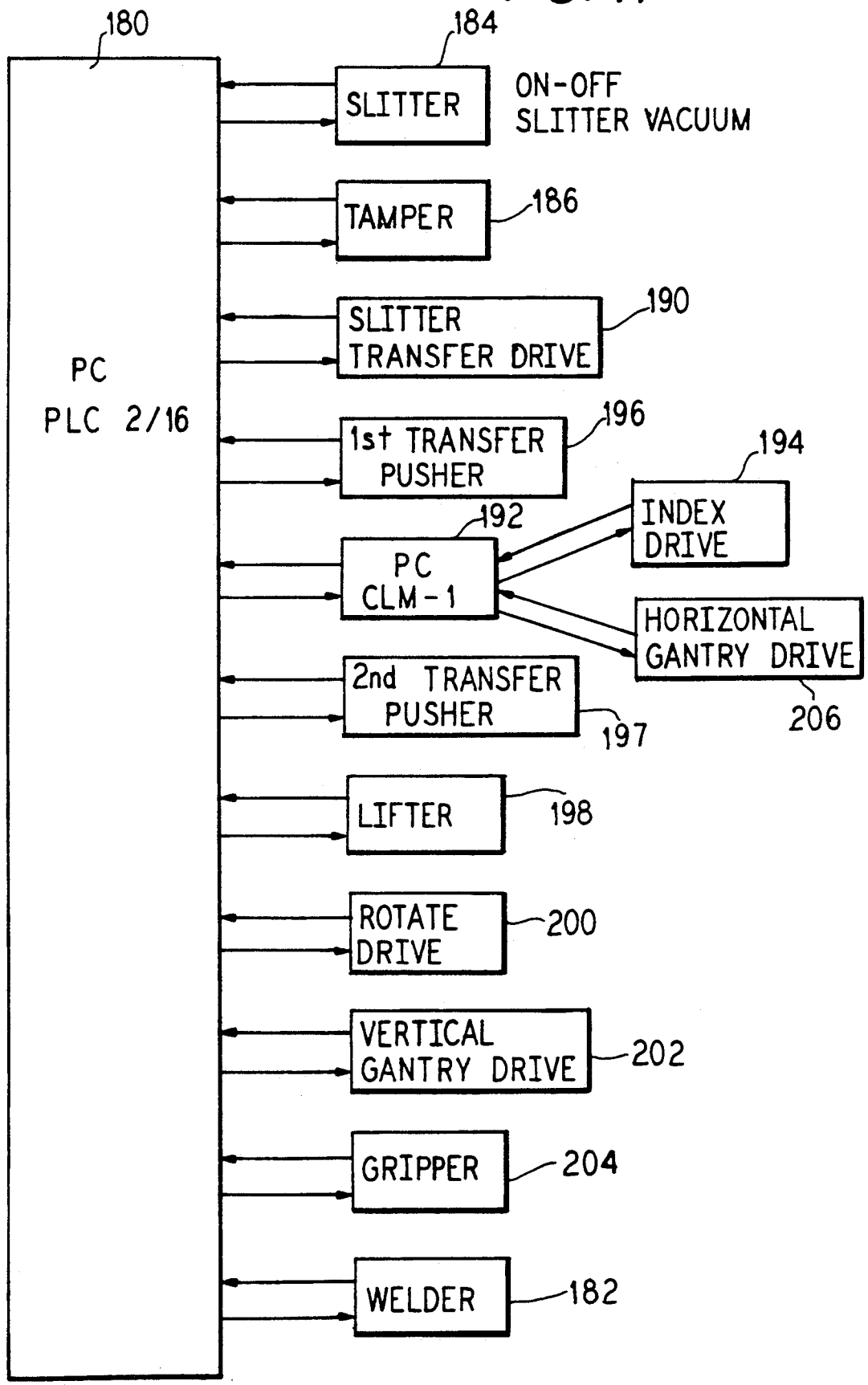
FIG. 11 is a functional block diagram of a control system for the present apparatus.

Although a variety of automatic control systems may be used, one embodiment of the present invention utilizes an Allen-Bradley PLC 2/16 automatic control processor 180, as shown in FIG. 11. Each phase of the control scheme incorporates sensors, such as photo cells and proximity switches, to verify the action of the component being controlled. The pneumatic cylinders generally are controlled by the main control 180 through the operation of solenoid valves. First, the processor 180 receives input signals from welder sensors 182 that sense the stack height in the welder hopper 66. When the stack of blanks in the welder hopper 66 falls below a predetermined sensed level, the sensor 182 signal indicates to the automatic control means 180 that more blanks are needed. If the slitter 20 is not already cutting blanks, the slitter control 184 is instructed to turn on the slitter vacuum which causes the feeding of metal sheets into the slitter 20, thus enabling the slitter 20 to cut the sheet metal into blanks B and feed them into the side-by-side arrangement 32. The tamper cylinder 186, if provided, is operated periodically during the blank accumulation.

After a predetermined number of the metal sheets have been fed through the slitter 20 as determined by a counter associated with the slitter control 184, the stacks S accumulated in the side-by-side arrangement have reached the desired height. The slitter vacuum 184 is then interrupted briefly to stop the input of metal sheets into the slitter. A timer assures that the last sheet has passed through the slitter before further action occurs. A sensor in the slitter also determines whether a safety guard on the slitter has been moved and, if so, stops the slitter altogether.

A slitter transfer signal is sent by the main controller 180 to a slitter transfer drive 190 which is the motor 84 shown in FIG. 2 to move the side-by-side arrangement 32 from the stack accumulating position to the transfer position. In embodiments which include an air cylinder to move the side-by-side arrangement instead of the motor 84, the air cylinder is also controlled directly by the main controller 180.

If the indexing and storage station 42 is not already in the transfer position, a dedicated programmed controller 192 which is an Indramat CLM-1 controller causes the index drive servo motor 194 which is the motor 116 shown in FIG. 3 to move the index and storage station to the transfer position. The dedicated controller 192 enables simple control of the servo motor 116 by the main processor 180. Once in the transfer position, or if the indexing station is already in the transfer position, a signal is sent to the first transfer pusher cylinder 196 which is the air cylinder 48 shown in FIG. 1 to cause the rake-like structure to push the stacks from the side-by-side arrangement 32 into the indexing and storage station 42.

The side-by-side arrangement 32 is then moved back into the stack accumulating position at the output of the slitter 32 by the slitter transfer drive 190 and the slitter vacuum 184 is turned on to begin once again cutting the blanks B from the sheet metal and feeding the blanks B into the side-by-side arrangement 32.

The Indramat CLM-1 dedicated controller 192 is then instructed to move the storage and indexing station 42 from the transfer position to the indexed positions where one of the pockets of the indexing and storage station 42 is aligned with the single stack receiving station 60 in each of the indexing positions. The system controller 180 causes the second transfer pusher cylinder 197 which is the single stack transfer cylinder 120 of FIG. 4 to push the aligned stack S into the single stack receiving station 60. When received, the single stack is positioned at an angle to horizontal and in alignment with the indexing station 42. The lifter cylinder 198 is then operated to move the tooling plate 150 on the lift beam 152 against the lower-most blank in the stack S and lift the stack so that the stack is moved to a horizontal position and is simultaneously blocked to assure alignment of the blanks within the stack S. To rotate the stack S about the vertical axis, the master controller 180 prompts the rotate drive cylinder 200 which is the cylinder 148 of FIG. 5 to rotate the blocking structure 126 to the desired angle in alignment with the welder hopper 66. In embodiments using a servo motor to rotate the blocking structure, the servo motor is controlled through a dedicated control processor such as a second Indramat CLM controller similar to the controller 192.

In the lifted and rotated position, the stack S is in position for engagement by the gripper 90 of the transfer gantry. The vertical gantry drive 202 causes the arm 92 to be is lowered to place the gripper 90 about the stack S. In one embodiment, the vertical gantry drive is an open loop servo motor controlled by main controller signals fed through an amplifier. As the grippers are moved into place about the stack S, the air cylinders 204 that drive the grippers are operated to open the spring biased grippers. Once the grippers 90 are on either side of the stack, the air pressure is released by the cylinder 204 and the spring bias close the grippers and engages the stack. The arm 92 is then moved first vertically upward by the vertical gantry drive 202 and the carriage 94 is moved horizontally to over the welder hopper by a horizontal gantry drive servo motor 206 controlled through the dedicated controller 192. The arm 92 is moved vertically downward until the gripper 92 is just above the top-most blank in the welder hopper, as determined by sensors on the grippers. The air pressure cylinder in the gripper 90 is increased to release the stack just above the top of the welder hopper stack, so that an abrupt force on the feeder of the welder hopper 66 is avoided. Should the welder hopper be in an up position, such as during clearing of a jam in the welder, a sensor in the welder 182 reports this condition so that the arm 92 does not lower the gripper and strike the raised welder hopper.

FIG. 12 shows one of the pockets 30 of the side-by side arrangement 32 of a preferred embodiment. Although the blanks in the pockets may be supported at an angle only by a small block against one of the side walls of the pocket and by the base at the other corner, it is preferred, particularly for thinner blanks, to provide a support surface on which the lower-most blank of a stack is supported. Since many cans are now formed of metals having paint or other coatings thereon, the soft coatings must be handled carefully so as not to scratch the blanks. To accomplish this, the angled support surface 210 shown in FIG. 12 includes a plurality of rollers 212 arranged parallel to one another on which the lower-most blank of a stack S is supported. A similar arrangement of rollers is provided in an angled support surface in each of the pockets of the side-by-side arrangement 32 and in the indexing and storage station 44. The rollers enable the stacks to be slid on the rollers 212 between the side-by-side arrangement and the indexing and storage station so that the risk of scratching the blanks is eliminated.

Thus, there is shown and described an apparatus for accumulating and transferring blanks from a slitter to a welder hopper. The disclosed apparatus is capable of installation in a variety of arrangements to accommodate particular factory layouts. For instance, the side-by-side arrangement may move either direction from the slitter. The indexing and storage station may be on either side of the side-by-side arrangement for transfer of the blanks, and the indexing station may move in an indexed fashion to either direction once the stacks are stored therein. The single stack receiving station may be on either side of the indexing station, and the overhead transfer gantry may be at any angle to the direction of movement of the side-by-side arrangement and indexing station as a result of the rotation of the single stack receiving station. The overhead transfer gantry may transport the stacks over either a long or short distance and may lift the stacks over walkways or other equipment. Thus, virtually any factory layout may be accommodated.

Although shown in the drawings without protective guards and shields, an installation of the present apparatus in a factory setting would include various guards, shields and other safety devices for the protection of the factory workers.

The present device is particularly well adapted for easy change over to different size can blanks. Likewise, simple and convenient repair and maintenance of the present apparatus and surrounding equipment is possible, in part due to the bearing structure on which the apparatus is mounted.

Although other modifications and changes may be suggested by those skilled in the art, it is the intention of the inventors to embody within the patent warranted hereon all changes and modifications as reasonably and properly come within the scope of their contribution to the art.

We claim:

1. A can blank accumulating and transfer device for moving can blanks from a slitter to a welder hopper, comprising:

a side-by-side arrangement of blank receiving locations positionable at an output of the slitter, said side-by-side arrangement including means for accumulating into stacks a plurality of can blanks output by the slitter to that the stacks are in side-by-side relation;

an indexing station selectively alternately positionable along side and movable away from said side-by-side arrangement, said indexing station including means for receiving a plurality of the stacks from said side-by-side arrangement;

first means for transferring the plurality of the stacks accumulated in said side-by-side arrangement into said indexing station;

a single stack receiving station including means for receiving single stacks from said indexing station; and second means for transferring one stack at a time from said indexing station to said single stack receiving station by pushing the one stack at a time from said indexing station to said single stack receiving station.

2. A can blank accumulating and transfer device as claimed in claim 1, further comprising:

means for moving said side-by-side arrangement from the output of the slitter into a position along side said indexing station during transfer of the stacks by said first means for transferring.

3. A can blank accumulating and transfer device as claimed in claim 1, further comprising:

means for intermittently contacting an edge of the stacks during accumulation of the blanks into stacks in said side-by-side arrangement to align the blanks in the stacks.

4. A can blank accumulating and transfer device as claimed in claim 1, wherein said side-by-side arrangement includes means for accumulating the blanks into stacks lying at an angle to horizontal.

5. A can blank accumulating and transfer device as claimed in claim 1, wherein said means for transferring transfers all the stacks in said side-by-side arrangement into said indexing station substantially simultaneously.

6. A can blank accumulating and transfer device as claimed in claim 1, wherein said single stack receiving station includes means for lifting a single stack of the blanks from a received position at which the stack is received from said indexing station to a predetermined height above said received position.

7. A can blank accumulating and transfer device as claimed in claim 6, wherein said means for lifting further comprises means for moving the single stack from a position at an angle to horizontal to a horizontal position.

8. A can blank accumulating and transfer device as claimed in claim 1, wherein said single stack receiving station includes means for rotating a single stack of blanks from a received position at which the stack is received from said indexing station to a predetermined angle relative to said received position.

9. A can blank accumulating and transfer device as claimed in claim 8, further comprising:
   means for lifting a single stack of the blanks from the received position to a predetermined height above said received position.

10. A can blank accumulating and transfer device as claimed in claim 1, further comprising:
    means for engaging the stack of blanks in said single stack receiving station to and transferring the engaged stack to the welder hopper.

11. A can blank accumulating and transfer device as claimed in claim 1, wherein said side-by-side arrangement includes a plurality of generally vertically disposed walls on a base defining side-by-side pockets to receive the blanks from the slitter.

12. A can blank accumulating and transfer device as claimed in claim 11, wherein said side-by-side arrangement is a first side-by-side arrangement, and further comprising:
    means for removably affixing said base at the output of the slitter so that said side-by-side arrangement is selectively removable and replaceable with a further side-by-side arrangement having vertically disposed walls spaced differently than those of said first side-by-side arrangement.

13. A can blank accumulating and transfer device as claimed in claim 11, wherein said indexing station includes a plurality of generally vertically disposed walls on a base defining side-by-side pockets to receive the blanks from said side-by-side arrangement.

14. A can blank accumulating and transfer device as claimed in claim 13, wherein said walls of the indexing station define slightly wider pockets than said walls of said side-by-side arrangement.

15. A can blank accumulating and transfer device as claimed in claim 13, further comprising:
    blank supporting surfaces in each of said pockets of said side-by-side arrangement and of said indexing station to support a bottom-most blank of the stacks, said blank supporting surfaces each lying at an angle to horizontal.

16. A can blank accumulating and transfer device as claimed in claim 15, wherein said blank supporting surfaces each include a plurality of parallel disposed rollers on which the bottom-most blanks are supported for rolling movement between said side-by-side arrangement and said indexing station.

17. A can blank accumulating and transfer device for moving can blanks from a slitter to a welder hopper, comprising:
    blank receiving means at an output of the slitter for forming a plurality of side-by-side stacks of blanks as the blanks are received from the slitter;
    storage means for storing the plurality of side-by-side stacks in side-by-side arrangement;
    means for transferring the side-by-side stacks from said blank receiving means to said storage means;
    single stack transfer means for selectively receiving single stacks from said storage means and lifting and rotating said single stacks individually to a removal position; and
    removal means for removing said single stacks individually from said single stack transfer means when in said removal position and for lifting and carrying said single stacks removed from said single stack transfer means to the welder hopper and subsequently placing said single stacks into the welder hopper.

18. A can blank accumulating and transfer device as claimed in claim 17, wherein said blank receiving means comprises:
    a base having a lateral extent extending substantially along the output of the slitter when in a position to receive blanks;
    means for mounting said base at the output of the slitter;
    a plurality of upright walls disposed along said base to define blank receiving pockets into which the blanks are received to form stacks.

19. A can blank accumulating and transfer device as claimed in claim 18, wherein said means for mounting comprises means for removably mounting said base for selective replacement of said base by further bases.

20. A can blank accumulating and transfer device as claimed in claim 17, wherein said means for transferring comprises:
    means for moving said blank receiving means from a position at the output of the slitter to a position adjacent said storage means, and
    means for pushing said side-by-side stacks from said blank receiving means into said storage means.

21. A can blank accumulating and transfer device as claimed in claim 17, further comprising:
    means for moving said storage means to a plurality of indexed positions so that each one of said side-by-side stacks is individually positioned opposite and adjacent said single stack transfer means in each of said indexed position; and
    means for pushing each one of said stacks from said storage means to said single stack transfer means as each of said stacks is positioned opposite and adjacent said single stack transfer means.

22. A can blank accumulating and transfer device as claimed in claim 18, wherein said storage means comprises:
    a base having a lateral extent extending substantially parallel to the lateral extent of said base of said blank receiving means; and
    a plurality of upright walls disposed along said base to define blank receiving pockets into which the stacks are received from said blank receiving means.

23. A can blank accumulating and transfer device as claimed in claim 20, wherein said means for moving said blank receiving means comprises:
    a toothed belt having a portion affixed to said blank receiving means;
    pulleys supporting said toothed belt extending between the output of the slitter and a position adjacent said storage means; and
    motor means for selectively driving said toothed belt about said pulleys to move said blank receiving means.

24. A can blank accumulating and transfer device as claimed in claim 21, wherein said means for moving said storage means comprises:
    a threaded shaft rotatably mounted substantially parallel to a direction of said side-by-side stacks,
    a threaded member mounted on said threaded shaft for movement along said shaft as said shaft is rotated, said threaded member being affixed to said storage means, and motor means for selectively rotatably driving said threaded shaft to move said storage means in a direction of said threaded shaft.

25. A can blank accumulating and transfer device as claimed in claim 20, wherein said means for pushing comprises:
   a fluid cylinder having an actuator driven by fluid movement in or out of said cylinder, and
   an arm mounted on said actuator having a plurality of fingers for contacting said side-by-side stacks in said blank receiving means and pushing said side-by-side stacks into said storage means when said actuator is driven by the fluid movement and when said blank receiving means is adjacent said storage means.

26. A can blank accumulating and transfer device as claimed in claim 21, wherein said means for pushing comprises:
   a fluid cylinder having an actuator driven by fluid movement in or out of said cylinder, and
   an arm mounted on said actuator for contacting each of said side-by-side stacks individually in said storage means and pushing each of said side-by-side stacks individually into said single stack transfer means when said actuator is driven by the fluid movement and when each of said stacks are aligned with said single stack transfer means.

27. A can blank accumulating and transfer device for moving can blanks from a slitter to a welder hopper, comprising:
   a side-by-side arrangement of blank receiving locations positionable at an output of the slitter, said side-by-side arrangement including means for accumulating into stacks a plurality of can blanks output by the slitter so that the stacks are in side-by-side relation, said side-by-side arrangement including a plurality of generally vertically disposed walls on a base defining side-by-side pockets to receive the blanks from the slitter;
   means for intermittently contacting an edge of the stacks during accumulation of the blanks into stacks in said side-by-side arrangement to align the blanks in the stacks relative to one another;
   an indexing station selectively positionable along side said side-by-side arrangement, said indexing station including means for receiving the stacks from said side-by-side arrangement, said indexing station including a plurality of generally vertically disposed walls on a base defining side-by-side pockets to receive the blanks from said side-by-side arrangement, said walls of the indexing station defining slightly wider pockets than said pockets of said side-by-side arrangement;
   blank supporting surfaces in each of said pockets of said side-by-side arrangement and of said indexing station to support a bottom-most blank of the stacks, said blank supporting surfaces each lying at an angle to horizontal, said blank supporting surfaces each including a plurality of parallel disposed rollers on which the bottom-most blanks are supported for rolling movement between said side-by-side arrangement and said indexing station;
   first means for transferring the stacks accumulated in said side-by-side arrangement into said indexing station, said first means for transferring transfers all the stacks in said side-by-side arrangement into said indexing station substantially simultaneously;
   means for moving said side-by-side arrangement from a position at the output of the slitter into a position along side said indexing station to permit transfer of the stacks by said first means for transferring;
   a single stack receiving station including means for receiving single stacks from said indexing station, said single stack receiving station including:
      means for lifting a single stack of the blanks from a received position at which the stack is received from said indexing station to a predetermined height above said received position, said means for lifting further comprises means for moving the single stack from a position at an angle to horizontal to a horizontal position,
      means for rotating a single stack of blanks from a received position at which the stack is received from said indexing station to an engagement position at a predetermined angle relative to said received position;
   second means for transferring one stack at a time from said indexing station to said single stack receiving station;
   means for engaging the stack of blanks in said single stack receiving station and for moving the engaged stack to the welder hopper; and
   a support base including a bearing supporting said side-by-side arrangement and said indexing station and said single stack receiving station as a unit for rotation relative to the slitter.

28. A can blank accumulating and transfer device as claimed in claim 27, wherein said side-by-side arrangement is a first side-by-side arrangement, and further comprising:
   means for removable affixing said base at the output of the slitter so that said side-by-side arrangement is selectively removable and replaceable with a further side-by-side arrangement having vertically disposed walls space differently than those of said first side-by-side arrangement.

* * * * *